Oct. 8, 1963 T. W. DRIESCH 3,106,265

DRUM BRAKE MECHANISM

Filed March 7, 1961

INVENTOR.
THEODORE W. DRIESCH
BY
*John B. Sponsler*

United States Patent Office 3,106,265
Patented Oct. 8, 1963

3,106,265
DRUM BRAKE MECHANISM
Theodore W. Driesch, Roanoke, Va., assignor to General Electric Company, a corporation of New York
Filed Mar. 7, 1961, Ser. No. 94,011
3 Claims. (Cl. 188—75)

This invention relates to brake mechanism, and more particularly to dual shoe brakes wherein provision is made to obtain equal release of both shoes from the brake drum with which they cooperate.

Essentially the present invention is a modification of the structure of U.S. Patent 2,889,014, assigned to the assignee of the present invention, which discloses and claims an automatically adjusted dual brake shoe arrangement having floating lever operating linkage, together with a self-adjusting floating fulcrum mechanism so that equal brake shoe clearance is obtained.

The present invention provides a simplified construction, eliminating the floating fulcrum or "friction pivot," thereby effecting considerable cost savings and furnishing a more reliable brake shoe adjustment. This is brought about by supporting the pivot pin between a pair of flat springs instead of by a friction pivot, the springs being carried by an adjustable support that is normally clamped in place after each adjustment. Consequently, when one brake lining wears faster than the other it will move closer to the brake drum forcing the pivot pin against one of the springs. The spring support is thereafter unclamped allowing the supporting bar to be moved to the proper position by the tension of the spring that has become stressed so that both brake shoes again bear evenly against the brake drum and the support can again be clamped.

In order to adjust for wear of brake shoe linings it is necessary to reduce the effective length of the tie rod as in previous brake mechanisms of the subject type; however, automatic uneven wear compensation can be obtained at the same time merely by unclamping the spring support bar before adjustment and reclamping it after the adjustment is made. Essentially, therefore, there is a single adjustment for both wear and equal brake shoe clearance.

It is an object of this invention to provide an improved means for simultaneously adjusting the operating linkage of a dual shoe brake to bring about wear compensation of the brake linings regardless of whether one of the linings is worn more than the other or not.

It is another object of this invention to provide an adjustable dual shoe brake mechanism of reduced cost of manufacture.

The novel features of the invention are set forth with particularity in the appended claims. The invention itself, however, both as to its organization and method of operation, together with further objects and advantages thereof, may best be understood by referring to the following description and the accompanying drawing.

Figure 1:
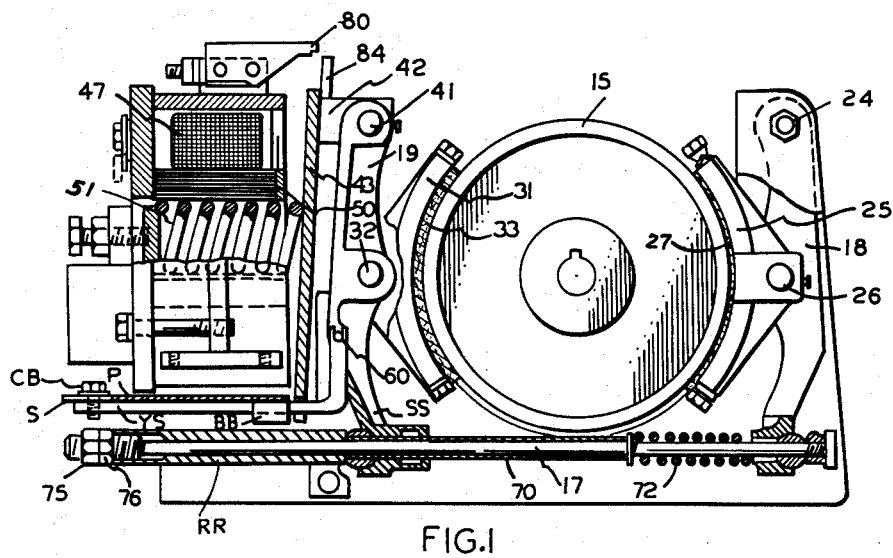
FIG. 1 is an elevation view of a dual brake shoe electromagnetic brake with part of the mechanism broken away, the reference names and numbers of the components for the most part being in accord with those of the patent referred to above.

The brake drum 15 (see FIG. 1) is positioned to coact with the shoes 25 and 31 via their respective linings 27 and 33, the shoes being pivotally supported by the yokes 18 and 19 by pivot pins 26 and 32 respectively. The yokes 18 and 19 are pivoted at their upper ends by pins 24 and 41, respectively, the yoke 19 being fastened to the lug 42 of an armature 43 coacting with the pole piece 50 under the influence of the energization of the winding 47. The lower ends of the yokes 18 and 19 are pivotally interconnected by a tie rod 17 held under tension by a spring 72 in a supporting tube 70 and adjustable via lock nut 75 and adjusting member 76 to compensate for wear of the brake linings 27 and 33 as described in U.S. Patent 2,889,014 previously referred to.

The brake shoes 25 and 31 normally urge their respective linings against the drum 15 under pressure developed by the compression of a spring 51 coacting with the armature 43 and the aforementioned pole piece 50 except when the winding is energized (i.e. the brake is applied every time the winding is deenergized) via armature 43, lug 42, pin 41, yoke 19, pin 32 to shoe 31 (and via the tie rod 17 to yoke 19 through the pin bearing at the lower end SS of yoke 19) to yoke 18, pin 24 and shoe 25.

Figure 2:
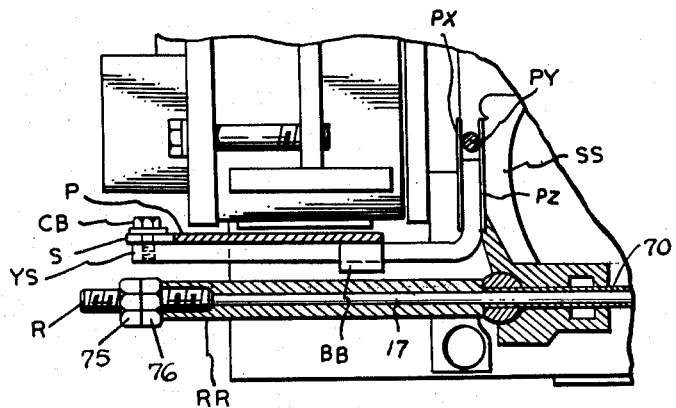
FIG. 2 is a partial view of the lower left portion of the structure of FIG. 1 somewhat enlarged illustrating the novel improvement described herein in detail.

Yoke 19 also carries a pin 60 or PY (as in FIG. 2), which coacts with a support YS normally clamped by a screw CB to a plate P attached to the frame carrying the winding 47 (FIG. 1). The support YS is slidable within a holder BB that is also attached to plate P. The plate P is provided with a slotted opening S through which the screw CB passes to the support YS so that the latter may be translated (right and left as viewed in FIG. 2) when the screw CB is loosened. On the end of the support YS the pin PY is cradled between two flexible extensions PX and PZ.

For adjusting wear of the brake shoe linings the adjusting nut 76 is used as previously described; however, the screw CB is loosened so that the support YS is also moved by its connection (extensions PX and PZ) with the pin PY of yoke 19 to permit the proper gap adjustment with end 80 and fork 84 (see U.S. Patent 2,889,014 previously referred to). When the desired shoe clearance is obtained, as determined by the gap, the support YS will be automatically moved to give equal clearance for both shoes by its cooperation with the pin PY between the extensions PX and PZ, thereafter the screw CB being tightened. In the event that uneven wear occurs with the shoe linings, one of the shoes will move closer to the drum 15 than the other shoe; consequently, the pin PY will move against either the extension PX or PZ displacing it by virtue of its flexibility so that when the screw CB is next loosened the support YS will slide in the proper direction to restore the brake shoes to equal spacing from the drum 15.

The brake shoe arrangement described above results in a much less costly structure than those employing so-called "friction pivots," as shown in the reference patent noted above. Furthermore, a positive setting of the brake shoe adjustment is obtained that is not subject to slippage where oil or other undesirable substances may contaminate the "friction pivot" type of structure.

While this invention has been explained and described with the aid of a particular embodiment thereof, it will be understood that the invention is not limited thereby and that many modifications will occur to those skilled in the art. It is therefore contemplated by the appended claims to cover all such modifications as fall within the scope and spirit of the invention.

What is claimed is:

1. A brake mechanism comprising a rotatable drum, a pair of opposed brake shoes capable of frictional contact with said drum, a pair of levers pivotally mounting said brake shoes for coacting with said drum, the first of said levers being pivoted at one end to a fixed mounting, the second of said levers being pivoted at a corresponding end to an operating arm, a spring biased, adjustable operating linkage connecting the free ends of said levers for adjusting the spacing of said shoes from said drum, a support bar, a mounting for said support bar spaced a predetermined distance from said second lever, a releasable clamp to hold said bar in said mounting, a pivot pin on said second lever, a pair of flexible extensions on the end of said bar coacting with said pivot pin to position said bar in said mounting when said clamp is released for compensating for uneven wear of said brake shoes.

2. A brake mechanism comprising a rotatable drum, a pair of opposed brake shoes capable of frictional contact with said drum, a pair of levers pivotally mounting said brake shoes for coacting with said drum, the first of said levers being pivoted at one end to a fixed mounting, the second of said levers being pivoted at a corresponding end to an operating arm, a spring biased, adjustable operating linkage connecting the free ends of said levers for adjusting the spacing of said shoes from said drum, an adjustable bar, a mounting for said bar having a predetermined relationship with said second lever, means for clamping said bar to said mounting, a pivot pin on said second lever, and a pair of flexible extensions on said bar coacting with and surrounding said pin whereby said bar is automatically adjusted when said clamping means is loosened to compensate for uneven wear of the said brake shoes.

3. A brake mechanism comprising a rotatable drum, a pair of opposed brake shoes capable of frictional contact with said drum, a pair of levers pivotally mounting said brake shoes for coacting with said drum, the first of said levers being pivoted at one end to a fixed mounting, the second of said levers being pivoted at a corresponding end to an operating arm, a spring biased, adjustable operating linkage connecting the free ends of said levers for adjusting the spacing of said shoes from said drum, an adjustable support bar, means for mounting said bar in spaced relationship with said second lever, means for clamping said bar to said mounting means, a pivot pin on said second lever, and a pair of flexible extensions on the end of said bar between which said pin is operatively contained for adjusting said bar automatically when said clamping means in loosened to compensate for uneven wear of the said brake shoes.

References Cited in the file of this patent
UNITED STATES PATENTS

| | | |
|---|---|---|
| 1,120,728 | Lutz | Dec. 15, 1914 |
| 2,889,014 | Goetz | June 2, 1959 |